United States Patent
Chen et al.

[11] Patent Number: 6,149,452
[45] Date of Patent: Nov. 21, 2000

[54] MECHANICAL STRUCTURE AND METHOD FOR ASSEMBLING AN ADDRESSABLE MODULE FOR DOWN CONVERTER

[75] Inventors: Hocking Chen; Tai-Mo Wang, both of Hsinchu, Taiwan

[73] Assignee: Transystem, Inc., Hsinchu, Taiwan

[21] Appl. No.: 09/217,717

[22] Filed: Dec. 21, 1998

[51] Int. Cl.[7] .................................. H01R 13/627
[52] U.S. Cl. .................. 439/364; 439/76.1; 439/797; 439/271
[58] Field of Search .................... 439/76.1, 578, 439/579, 801, 908, 737, 738, 739, 535, 364, 271, 797, 218

[56] References Cited

U.S. PATENT DOCUMENTS

| | | | |
|---|---|---|---|
| 3,617,811 | 11/1971 | McVoy | 439/76.1 |
| 4,015,070 | 3/1977 | Theurer | 439/76.1 |
| 4,822,293 | 4/1989 | Robson | 439/271 |
| 5,829,992 | 11/1998 | Merker et al. | 439/797 |
| 5,906,512 | 5/1999 | Reynolds | 439/76.1 |

*Primary Examiner*—Paula Bradley
*Assistant Examiner*—Tho D. Ta
*Attorney, Agent, or Firm*—Bo-In Lin

[57] ABSTRACT

The present invention discloses a frequency down converter for a multichannel multipoint distribution service (MMDS) television (TV) signal transmission and receiving system. The down converter system includes a separate address module for controlling signal reception for a subscriber according to a subscribing status carried by radio frequency signals transmitted from a signal transmission station. The address module includes a module container for containing a main circuit assembly therein. The down converter further includes a F-type connector for screwing onto the main circuit assembly through a connector opening of the module container for establishing an electric contact and for mechanically pulling the electric circuit assembly for sealing another opening on the module container.

10 Claims, 3 Drawing Sheets

MECHANICAL STRUCTURE AND METHOD FOR ASSEMBLING AN ADDRESSABLE MODULE FOR DOWN CONVERTER

BACKGROUND OF THE INVENTION

1. Field of the Invention

This invention relates generally to a configuration and method for employing an electrical connector for assembling and sealing an opening of a container for containing electric circuits. More particularly, this invention relates to a new and improved structure and method for simplifying the assembling procedure for manufacturing an electrical device such as an addressable module of a down converter.

2. Description of the Prior Art

For addressable module to control the television signal reception from a down converter, there are several technical difficulties exist even that such module is remotely controllable. With the remotely adjustable unit, the trouble of sending service personnel to manually turn on or turn off the control unit to allow a television viewer to receive signals from a down converter is no longer necessary. However, due to the "either continuously-on or continuously-off" nature of the addressable module, now commonly available, difficulties exist when a poor reception occurs at a television set Because the poor reception could be caused by several different problems, isolation of problems along the signal reception and processing path becomes more complicate and requiring more measurements before the real reasons of poor reception can be identified.

Referring to FIG. 1 for a functional block diagram of a fix-addressed down converter commonly employed in a conventional system. This addressable down converter 1 includes a down converter 11 to convert the signals received from an antenna 13, typically transmitted in radio frequency (RF), to a lower frequency, e.g., in an intermediate frequency (IF) range, suitable for inputting to television as input signals. Before the down converted signals is inputted to a television as input signals, the fix-addressed down converter further includes a fix-address control unit 12 to control the transmission of the signals to the television. This fix-address control unit 12 has a remotely controlled enable/disable switch, i.e., a fixed-address signal received from a remote main station, to turn on or off an intermediate frequency gain controller. By remotely turning off the intermediate frequency gain controller, the fixed-address control unit 12 is disabled and the intermediate frequency signals generated by down converter 11 are transmitted to the television without proper gain. A television viewer receives the image signals distorted by much stronger noise signals and can not have clearly view of the images to be produced by the down converted signals transmitted from the TV broadcast stations. On the other hand, when the fixed-address enabling signals are received to turn on the intermediate frequency gain controller, the down converted signals from the down converter 11 is properly amplified with the predefined gain factors to provide clearly image display to the television viewer.

While the down converter as that shown in FIG. 1 provides the advantage of remotely turning on and off a down converter, additional difficulties arises from this configuration. Frequently, there are confusions to identify problems what are the real problems when there is poor reception of a television set. It is uncertain whether a poor antenna reception or the malfunction of the fixed-address control unit is the real cause of the poor reception. Additional measurements must be performed to identify the troubles when a television set has a poor reception. Furthermore, the assembling process for manufacturing a down converter as that shown in FIG. 1 often involves multiple steps of attaching several parts of the down converter together by tightening up several screws or other types of mechanical attachment fixtures. Not only that these multiple steps of assembling are more time consuming and costly. Also, each of the interface points between these separate parts becomes a potential vulnerable weak point of breaking or leak after long term operation.

Therefore, a need still exists in the art of down converter for television signal reception to provide a new structure and signal transmission control method to resolve these difficulties encountered in the prior art systems. In addition to achieve the purpose that clear image signals from the down converter can be delivered for display on the television for flexibly controllable time segments, improved mechanical structure of an address module is also disclosed. The assembly process for manufacturing the address module is simplified. More reliable addressable module with a mechanical structure of higher integrity is also provided.

SUMMARY OF THE PRESENT INVENTION

It is therefore an object of the present invention to provide a novel down converter structure and signal transmission control method by providing a flexibly adjustable addressable module manufactured by simplified assembly process to resolve the difficulties encountered in the prior art systems. A separate addressable module is implemented to control the transmission of the television image signals. The mechanical structure of this separate address module is greatly simplified whereby the aforementioned difficulties and limitations in the prior art can be overcome.

Specifically, it is an object of the present invention to provide a novel mechanical structure for the addressable module where an electrical connector, e.g., F-type connector, is implemented to serve multiple functions. In addition to serve a connector's original function of securely and reliably establishing electrical contact, the connector is applied to serve a second function of mechanically secure and seal the electric circuit assembly of the address module to a module container.

Another object of the present invention is to provide novel mechanical structure for the addressable module to greatly simplify the assembling process. An electrical connector, e.g., F-type connector, is implemented to mechanically secure and seal the electric circuit assembly inside a module container of the address module to achieve high structure integrity by applying a simplified one-step assembling process.

Briefly, in a preferred embodiment, the present invention includes a frequency down converter for a multichannel multipoint distribution service (MMDS) television (TV) signal transmission and receiving system. The down converter system includes a separate address module for controlling signal reception for a subscriber according to a subscribing status carried by radio frequency signals transmitted from a signal transmission station. The address module includes a module container for containing an main circuit assembly therein. The down converter further includes a F-type connector for screwing onto the main circuit assembly through a connector opening of the module container for establishing an electric contact and for mechanically pulling the electric circuit assembly for sealing another opening on the module container.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
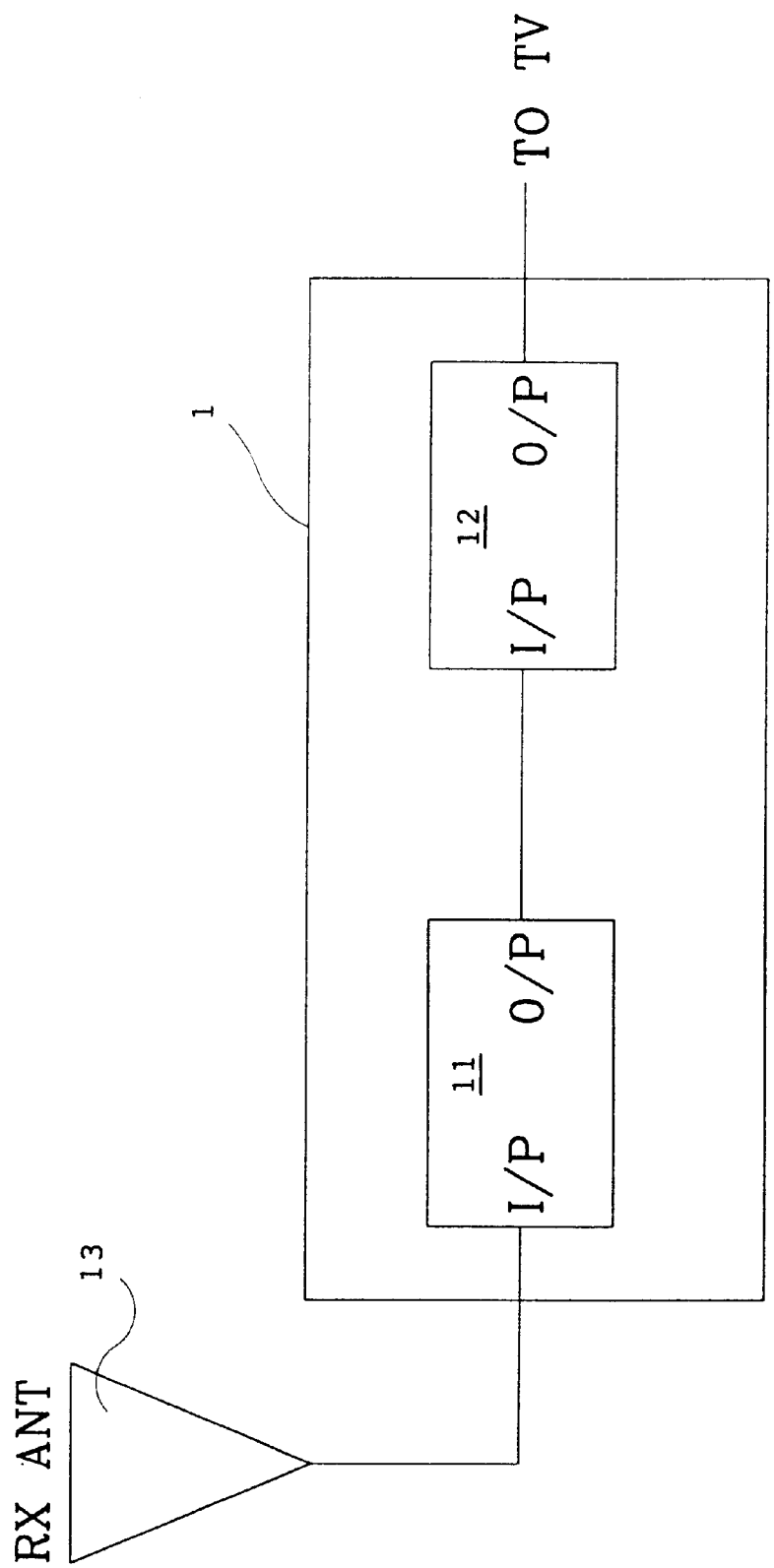
FIG. 1 is a functional block diagram of a conventional addressable unit implemented in a down converter.
Figure 2:
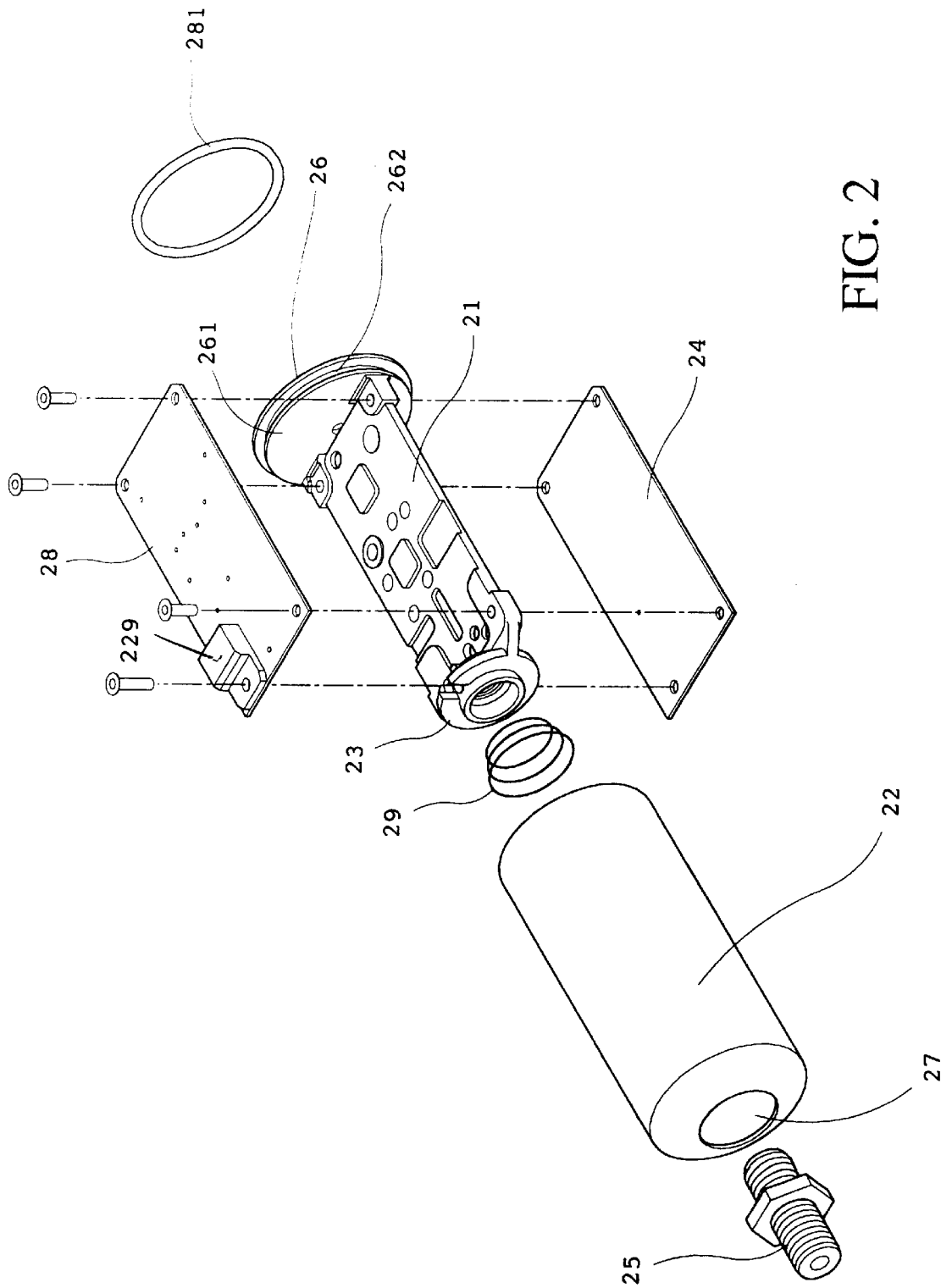
FIG. 2 is a perspective view showing the mechanical structure of a separate address module of a novel down converter of the present invention.

Referring to FIG. 2 for an exploded view of an addressable module of the present invention. The addressable module is supported on a main plate 21. Affixed to the main plate is a bottom printed circuit board 24 securely attached to a top printed circuit board 28 via four screws and nuts, or rivets or other types of attachment mechanisms. The main plate is formed on a plate formed as a die-cast metal unit body with a seal plate 26. Affixing the top printed circuit board 28 and the bottom printed circuit board 24 by tightening four screws to the nuts or securely fixing other types of attachment mechanisms forms a main circuit-assembly. The main circuit-assembly is ready to place into an addressable module container 22 from a rear opening of the module container 22. The seal plate 26 has an 0-ring trench 262 for placing an O-ring 281 in the trench 262 formed on the edge of a platform 261 supported on the seal plate 26. The module container 22 has a connector opening 27 for inserting a connector 25. The main plate 21 further has a connector receptor 23 for receiving the connector, e.g. an F-type connector. The addressable module further includes a spring 29 to asserting a pushing-force against the main plate toward the rear opening to make it easier to remove the main circuit assembly from the container 22 when the F-type connector 25 is loosened from the connector receptor 23.

The process for assembling the addressable module is greatly simplified by inserting the main circuit assembly into the module container 22. The seal plate 26 with the O-ring 281 tightly engages the edges of the rear opening of the module container 22. By inserting the F-type connector 25 into the connector receptor 23 via the connector opening 27, and by tightening the F-type connector 25, the seal plate tightly seals the rear opening of the module container 22. Meanwhile, the F-type module has its own O-ring to tightly engage the edge of the connector opening 27 and tightly seal the connector opening 27.

The main plate has a ground contact means 229 to provide a ground potential for contacting with the ground contact areas disposed on the top and bottom printed circuit boards 28 and 24 respectively. The top printed circuit board 28 and the bottom printed circuit board 24 are tightly attached to the main plate 21. The ground contact means 229 is formed as a spring body to tightly engage the module container 22. The ground contact means 229 is further in tight electrical contact with the spring 29. The spring 29 is composed of conductive material that is in contact with the connector receptor fixture 23. Thus, a reliable ground potential is provided to the addressable module through reliable and tight contact with the module container 22 via the ground contact means 229 and the conductive spring 29.

Figure 3:
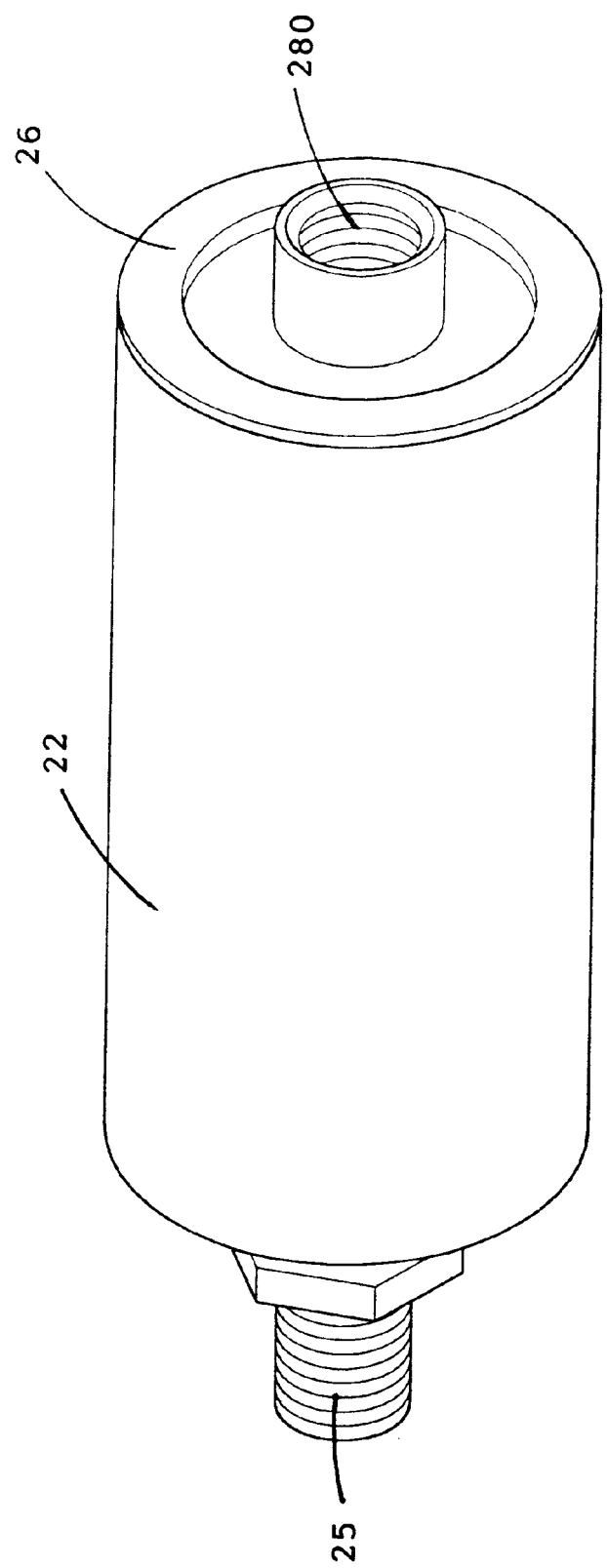
FIG. 3 is a perspective view of the assembled addressable module of this invention.

Thus, a simple screw-tightening action can now applied to complete the assembling process for this improved address module assembly. There is no need for applying special tools for performing sealing, soldering or other fixing operations to assemble the addressable module for the purpose of providing a tightly sealed reliable module as that required by a conventional down converter. The module provides reliable structure integrity with minimum concerns of leaking or breaking. The F-type connector 25 is provided to serve dual functions that include a first function of electrically contacting the circuits of the addressable module formed on the main plate 21. And, a second function served by the F-type connector is to seal the openings of the module container 22 by asserting force along two different directions. The first direction of a force applying by the F-type connector 25 is a pushing force to engage the O-ring of the F-type connector 25 toward the edge of the connector opening 27 thus seals the connector opening 27. The second direction of force is a pulling force to pull the main plate 21 with the seal plate 26 to tightly engage the O-ring 281 against the edge of the rear opening thus seals the rear opening of the module container 22. FIG. 3 shows an assembled addressable module, which is ready for attached to a down converter for controlling video image signals for transmitting a television. A screw-on type of attachment mechanism 280 is formed on the bottom of the seal plate 26 and ready for screwing onto a down converter as a separate addressable module.

According to FIG. 2 and the above descriptions, this invention disclose an address module for a frequency down converter implemented in a multichannel multipoint distribution service (MMDS) television (TV) signal transmission and receiving system. The down converter system includes a separate address module for controlling signal reception for a subscriber according to a subscribing status carried by radio frequency signals transmitted from a signal transmission station. The address module includes a module container 22 for containing a main circuit assembly therein. The down converter further includes a F-type connector 25 for screwing onto the main circuit assembly through a connector opening 27 of the module container 22 for establishing an electric contact and for mechanically pulling the electric circuit assembly for sealing another opening, the rear opening on the module container 22. In a preferred embodiment, the main circuit assembly further includes a seal plate 26 for sealing the second opening disposed on the module container 22 opposite the connector opening 27. In a preferred embodiment, the module container 22 constitutes a single-body container. The single body container has the connector opening 27 and the second opening whereby the module container is completely sealed by the F-type connector 25 and seal plate 26 as the F-type connector 25 being tightly screwed onto the main circuit assembly through the connector opening 27. In a preferred embodiment, the main circuit assembly further includes a ground contact means 229 for tightly contacting the module container 22 for providing a reliable ground potential. In a preferred embodiment, the ground contact means 229 further includes a metallic spring 29 for tightly engaging the module container 22 for providing the ground potential. In a preferred embodiment, the F-type connector 25 and the seal plate 26 each includes an O-ring 281 for tightly sealing the connector opening 27 and the second opening respectively for assuring a leak-proof addressable module enclosed in the module container 22. In a preferred embodiment, the main plate 21 is formed with the seal plate 26 constitute an integral metal piece.

In summary, this invention discloses an address module for a frequency down converter. The addressable module includes a module container 22 for containing a main circuit assembly therein. The addressable module further includes a connector 25 for securely attaching onto the main circuit assembly through a connector opening of the module container for establishing an electric contact. The connector 25 is also for mechanically sealing the connector opening 27 and also for pulling the main circuit assembly for sealing a second opening on the module container 22. In a preferred embodiment, the connector 25 is an F-type connector.

This invention further discloses a method for assembling an electric apparatus by enclosing a main circuit assembly in a container 22. The method includes the steps of attaching a connector 25 to the main circuit assembly through a connector opening 27 on the container 22 thus establishing an electric contact and also sealing the connector opening 27. And, asserting a force on the main circuit assembly through the step of attaching the connector 25 to the main circuit assembly thus closing and sealing a second opening on the container 22.

Therefore, this invention discloses a down converter structure and signal transmission control method by providing a flexibly adjustable addressable module manufactured by simplified assembly process to resolve the difficulties encountered in the prior art systems. A separate addressable module is implemented to control the transmission of the television image signals. The mechanical structure of this separate address module is greatly simplified. The difficulties and limitations in the prior art are overcome. Specifically, a novel mechanical structure for the addressable module is implemented where an electrical connector, e.g., F-type connector, is employed to serve multiple functions. In addition to serve a connector's original function of securely establishing a reliably electrical contact, the connector is applied to serve a second function of mechanically secure and seal the electric circuit assembly of the address module to a module container. By providing a novel mechanical structure for the addressable module, the assembling process is greatly simplified. An electrical connector, e.g., F-type connector, is implemented to mechanically secure and seal the electric circuit assembly inside a module container of the address module to achieve high structure integrity by applying a simplified one-step assembling process.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A frequency down converter for a Multichannel Multipoint Distribution Service (MMDS) television (TV) signal transmission and receiving system comprising:

a separate address module for controlling signal reception of a subscriber according to a subscribing status carried by radio-frequency (RF) signals from a signal transmission station;

said address module includes a module container having a main circuit assembly therein, said module container having a front-end opening and a rear-end opening;

said main circuit assembly having a receptacle connector at a front end thereof, and a seal plate formed as a single body with said main circuit assembly wherein said seal plate further having an attaching means disposed below said seal plate opposite from said main circuit assembly for securely attaching to said down converter at a rear end thereof;

a F-type connector for screwing onto said receptacle connector of said main circuit assembly through said front-end opening of said module container for establishing an electrical contact with said main circuit assembly and for mechanically pulling said main electric circuit assembly together with said seal plate in a direction toward said front-end opening wherein said seal plate provides a sealing for completely sealing said rear-end opening on said container module opposite said front-end opening whereby said main circuit assembly is completely sealed inside said container module.

2. The frequency down converter of claim 1 wherein:

said seal plate for sealing said rear-end opening attached to said main circuit assembly wherein said seal plate having a main surface perpendicular to a main surface of said main circuit assembly.

3. The frequency down converter of claim 2 wherein:

said main circuit assembly is supported on an assembly supporting metal plate and said seal plate is a metal seal plate formed as a single metal body integrated with said assembly supporting metal plate.

4. The frequency down converter of claim 2 wherein:

said module container providing a ground potential to said main circuit assembly.

5. The frequency down converter of claim 4 further comprising:

a metallic spring for tightly engaging said module container and said main circuit assembly for providing said ground potential to said main circuit assembly.

6. The frequency down converter of claim 2 wherein:

said F-type connector has a first O-ring for engaging said front-end opening and said seal plate has a second O-ring for engaging said rear-end opening for tightly sealing said front-end opening and said rear-end opening as said F-type connector being tightly screwed onto said main circuit assembly through said connector opening.

7. The frequency down converter of claim 6 wherein:

said attaching means disposed below said seal plate opposite from said main circuit assembly for securely attaching to said down converter is a screw-on type attaching means for securely screwing onto said down converter for attaching to said down converter at said rear end.

8. An address module for a frequency down converter comprising:

a module container having a main circuit assembly therein; and a connector for securely attaching onto said main circuit assembly through a front-end connector opening of said module container for establishing an electric contact to said main circuit assembly and for mechanically sealing said front-end connector opening and also for pulling said electric circuit assembly integrated with a seal plate engaged to a rear-end opening of said module container for complete sealing said rear-end opening whereby said module container is sealed in a single action of attaching said connector to said main circuit assembly through said front-end connector opening.

9. The address module of claim 8 wherein:

said connector is an F-type connector for screwing onto said main circuit assembly through said front-end connector opening.

10. A method for assembling a main circuit apparatus by enclosing an electrical assembly in a container comprising the steps of:

attaching a connector to said main circuit assembly through a front-end connector opening on said module container thus establishing an electric contact to said main circuit assembly and also sealing said front-end connector opening; and asserting a force simultaneously on a seal plate integrated with said main circuit assembly as a single-body unit through said step of attaching said connector to said main circuit assembly thus pulling said seal plate for closing and sealing a rear-end opening of said module container.

* * * * *